United States Patent
Aydin et al.

(10) Patent No.: US 6,212,572 B1
(45) Date of Patent: *Apr. 3, 2001

(54) DEVICE FOR THE UTILIZATION OF EXPORTED PSEUDOSOCKETS

(75) Inventors: Alev Aydin, Elancourt; Margaret Jacobs, Le Pecq; Annick Besnier, Bullion, all of (FR)

(73) Assignee: Bull S.A., Puteaux (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/949,211

(22) PCT Filed: Dec. 9, 1993

(86) PCT No.: PCT/FR93/01219

§ 371 Date: Aug. 10, 1994

§ 102(e) Date: Aug. 10, 1994

(87) PCT Pub. No.: WO94/14116

PCT Pub. Date: Jun. 23, 1994

Related U.S. Application Data (63) Continuation of application No. 08/284,588, filed on Aug. 10, 1994, now abandoned.

(30) Foreign Application Priority Data

Dec. 11, 1992 (FR) .................................................. 92 14971

(51) Int. Cl.[7] .......................................................... G06F 9/46

(52) U.S. Cl. ............................................................. 709/312

(58) Field of Search .................................... 395/684, 680, 395/500; 709/304, 300, 330, 310, 312, 227

(56) References Cited

U.S. PATENT DOCUMENTS

| 4,882,674 | * | 11/1989 | Quint et al. | 364/200 |
|---|---|---|---|---|
| 5,123,094 | | 6/1992 | MacDougall | 395/375 |
| 5,218,699 | * | 6/1993 | Brandle et al. | 395/200 |
| 5,313,638 | * | 5/1994 | Ogle et al. | 395/725 |
| 5,404,519 | * | 4/1995 | Denio | 395/650 |
| 5,475,601 | * | 12/1995 | Hwang | 364/473 |
| 5,497,463 | * | 3/1996 | Stein et al. | 395/200.03 |

(List continued on next page.)

FOREIGN PATENT DOCUMENTS

| 0371229 | 6/1990 | (EP) . |
|---|---|---|
| 2176636 | 12/1986 | (GB) . |

OTHER PUBLICATIONS

J. Verso, et al, "The Network Architecture of OSF/1 Version 2", OSF Research Institute, pp. 1–16, Feb. 2, 1994.*

(List continued on next page.)

Primary Examiner—Majid Banankhah
Assistant Examiner—Sue Lao
(74) Attorney, Agent, or Firm—Weingarten, Schurgin, Gagnebin & Hayes, LLP (57) ABSTRACT

The present invention concerns a device permitting the utilization of a remote procedure call of open systems employing the socket process in a proprietary application, utilizing primitives which do not exist in the proprietary system and running on a computer system which makes use of an open subsystem utilizing the socket, comprising: means for communicating between the proprietary application and an application of the open subsystem; means for coding the primitives of the proprietary application into a special format and storage of the primitives; means for launching an application under the open system (UNIX) to decode and execute the function called by the primitive and to return the result; means for decoding the result; means for ensuring the synchronization of the accesses to the shared memory.

8 Claims, 4 Drawing Sheets

U.S. PATENT DOCUMENTS

| | | | | |
|---|---|---|---|---|
| 5,530,844 | * | 6/1996 | Phillips et al. ....................... | 395/500 |
| 5,613,100 | * | 3/1997 | Anezaki ............................... | 395/500 |
| 5,619,699 | * | 4/1997 | Golshani et al. .................... | 395/705 |
| 5,652,885 | * | 7/1997 | Reed et al. ........................... | 395/651 |
| 5,721,876 | * | 2/1998 | Yu et al. .............................. | 395/500 |
| 5,822,563 | * | 10/1998 | Sitbon et al. ........................ | 395/500 |

OTHER PUBLICATIONS

"Each Piece in Its Place", Herrick J. Johnson, Unix Review, Jun. 1987, U.S. pp. 66–75.

"Coherence of Distributed Shared Memory: Unifying Synchronization and Data Transfer", Umakishore Ramachandrain, et al, Proceedings of the 1989 International Conference on Parallel Processing, vol. 11, Aug. 8, 1989, St. Charles, Illinois, pp. II–160—II–169.

"The Design of the Unix Operating System", Maurice J. Bach, Prentice/Hall International, Inc. Englewood Cliffs, N.J. 07632, U.S., pp. 355–390.

* cited by examiner

*FIG. 1*

FIG. 2 func_no : a value which represents a function
(integer)

jp : the J_no and the P_no for which the request is made
(integer)

func_value : the value of the function (filled by socket_serv after
(integer)     execution of the function)

loc_errno : 0 if the function is executed normally
(integer)

sys_ser_num : to identify the machine which made the request
(integer)

bkst0 : to identify the machine which made the request
(short)

rful : reserve
(short)

int1,int2,int3, : these fields serve to store the values of the parameters
int4,int5,int6    in the case of "integer" parameters
(integer)

buf : a zone of characters permitting storage of the values
(char[2000])   of a type other than "integer"

FIG. 3

| Function Name | Function number |
|---|---|
| uuid_gen | 1 |
| fcntl | 2 |
| socket | 3 |
| bind | 4 |
| close | 5 |
| gethostbyaddr | 6 |
| gethostbyname | 7 |
| gethostname | 8 |
| getsockname | 9 |
| recvfrom | 10 |
| sendto | 11 |
| setsockopt | 12 |
| select | 13 |
| closeall | 14 |
| gettimeofday | 15 |
| recvmsg | 16 |
| sendmsg | 17 |
| accept | 18 |
| connect | 19 |
| ioctl | 20 |
| listen | 21 |
| getsockopt | 22 |
| getpeername | 23 |
| send | 24 |
| recv | 25 |

*FIG. 4*

DEVICE FOR THE UTILIZATION OF EXPORTED PSEUDOSOCKETS

This application is a continuation of application Ser. No. 08/284,588, filed Aug. 10, 1994 abandoned.

FIELD OF THE INVENTION

The present invention concerns a device for the utilization of a remote procedure call of exported pseudosockets and the process implemented by the device.

BACKGROUND OF THE INVENTION

Computer systems utilizing a proprietary operating system are known. Also known to prior art are so-called "open systems", for example, UNIX, which, taking their programs and their constitution into account, comprise procedures for the remote calling of other open systems installed on remote computers. Likewise known are computers equipped with a proprietary operating system, that is to say, one specific to the constructor, is also the installation on these systems of an open subsystem, for example, of the UNIX type, which offers "communication sockets" (sockets) thus permitting remote communication to be established with another computer. Nevertheless, these systems do not permit applications running on an operating system specific to a constructor, for example, GCOS, to communicate with open systems, for example, of the UNIX type, and in particular with remote stations.

SUMMARY OF THE INVENTION

A principal goal of the invention is to propose a device permitting a communication link to be established between applications running on the operating system specific to the constructor and remote computers, through the open subsystem installed on the same machine.

The goal is achieved by the fact that the device permits the use of a remote call procedure of open systems, utilizing the socket procedure on a proprietary system employing primitives which do not exist in the proprietary operating system and running on a computer system which makes use of an open subsystem, this subsystem utilizing the socket, characterized by the fact that it comprises:

means of communication between the proprietary application and the subsystem via shared memory;
 means for coding the primitives of the proprietary application, which do not exist in the proprietary operating system, into a special format and the storage of these primitives in a shared segment of memory;
 means for launching an application on the open system in order to decode, and to cause the function requested by the primitive to execute and to return the result of the function, expressed in the special format, in the shared memory segment;
 means for decoding the result of the function expressed in the special format in such a way that the proprietary application has the "normal" visibility of the function, that is to say, as though the function were executed locally by the primary operating system;
 means for ensuring the synchronization of the accesses to the shared memory.

According to another feature, the means for ensuring the synchronization are a first, second and a third semaphore.

According to another feature, when the proprietary application executes an application P on the first semaphore, the application of the subsystem executes an operation P on the second semaphore, then the proprietary application executes an operation V on the second semaphore and an operation P on the third semaphore, then the application of the open subsystem executes an operation V on the third semaphore and, finally, the proprietary application executes an operation V on the first semaphore.

Per another feature, the special format in which the primitives, which do not exist in the proprietary operating system, are encoded contains a message zone constituted by a first field formed by an integer representing the function;

a second field representing the number of the process for which the request is made;
 a third field indicating the value of the function following execu- tion of the function;
 a fourth field indicating by the value 0 that the function has executed normally;
 a fifth and a sixth field for identifying the machine which made the request;
 a seventh reserved field ;
 eighth, ninth, tenth, eleventh, twelfth and thirteenth fields each designed to store the parameter values represented by an integer and;
 a fourteenth buffer field designed to store characters representing parameter values other than integers.

According to another feature, the means for coding the primitives of the proprietary application into the special format contain a correspondence table of the primitives with the integers representing the specific function and a specific program for each function permitting the useful fields of the format to be filled.

According to a further feature, the means for decoding the special format into primitives of the open subsystem contain a correspondence table of the integers with the primitives of the open subsystem and a processing program specific to the useful format and to each primitive of the open subsystem.

Another goal of the invention is to propose a process for imple- menting the device.

This goal is achieved by the fact that the procedure for the remote calling of remote computers, utilizing a proprietary operating system and having an open subsystem, consists of the following steps:

setting the first semaphore to state P by the proprietary system, and of a second semaphore by the open subsystem;
 coding of the function to be executed into a format given by the service routine of the proprietary system;
 writing of this coded function into a segment of memory which is shared;
 setting a second semaphore to state V;
 activation by setting a second semaphore of a socket server to state V, the latter running on the open subsystem;
 decoding by this application of the message contained in the segment and concomitant setting to state P of a third semaphore by the proprietary operating system;
 execution of the decoded function by the remote computer;
 reception of the result by the open subsystem and recoding of this result into the specific format;
 rewriting of the encoded result into the shared memory segment;
 the setting to state V of the third semaphore, thus causing the activation of the service routine application and setting to state P of the second semaphore, causing the socket server to, timeout;

interpretation of this service routine by the result of the function;

setting to state V of the first semaphore to permit other users of the proprietary operating system to make another remote call in the same manner, without data mixture by the two users.

BRIEF DESCRIPTION OF THE DRAWINGS

Other details and advantages of the present invention shall become more clear on reading the following description, made with reference to the drawings in which.

DESCRIPTION OF THE PREFERRED EMBODIMENT

Figure 1:
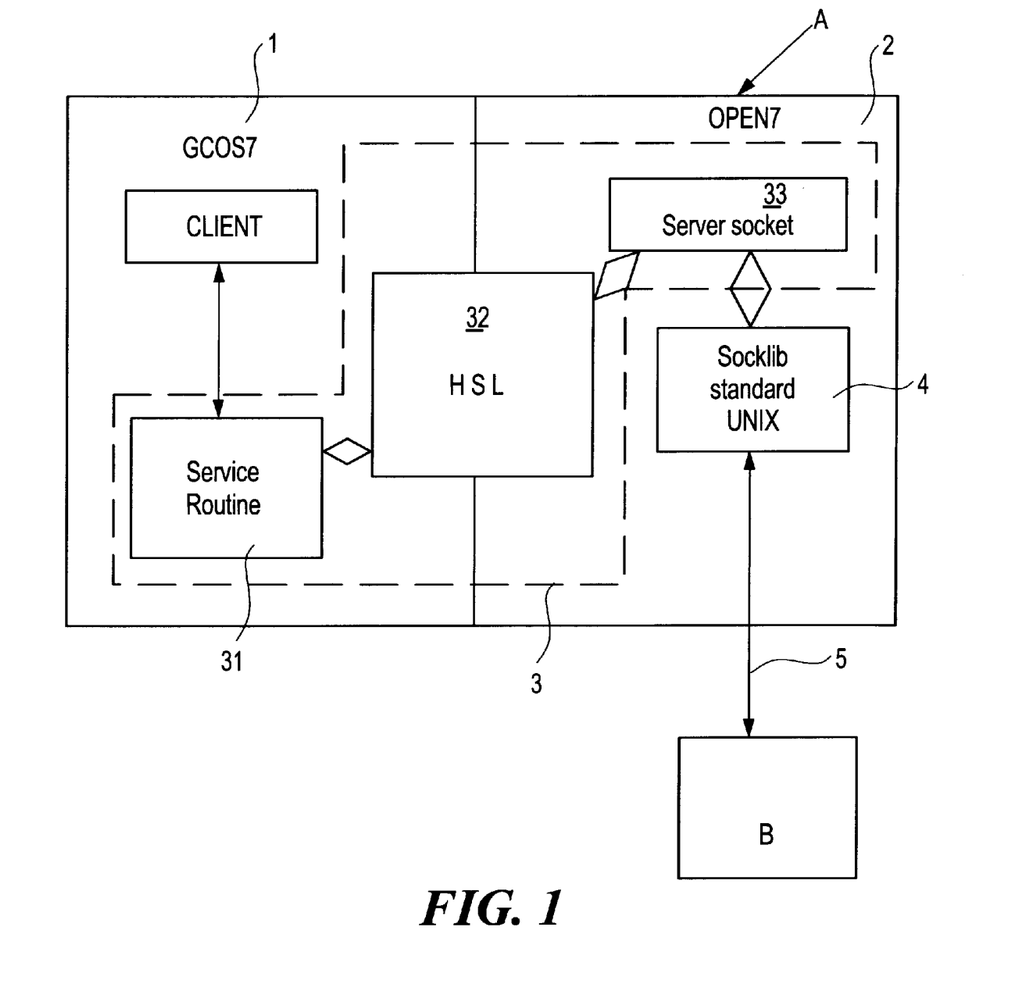
FIG. 1 shows a schematic view of the invented device.

FIG. 1 shows a computer system (A) containing a proprietary operating system, for example, one of the GCOS7 type, this computer system (A) being likewise able to function with an open subsystem, for example, OPEN7, of the UNIX type. This open UNIX subsystem (2) contains a standard (UNIX) library (4) permitting the utilization of socket functions of the UNIX environment. Nevertheless, in the computer system of the preceding type, there does not exist any possible communication between the proprietary operating system and the open subsystem, which thus permits the implementation of remote communication of the socket type. These remote socket functions enable systems running with the aid of the OPEN7 subsystem to communicate over the communications line (5) with another machine (B) of the type operating with an open system, for example, one of the UNIX type.

Figure 2:
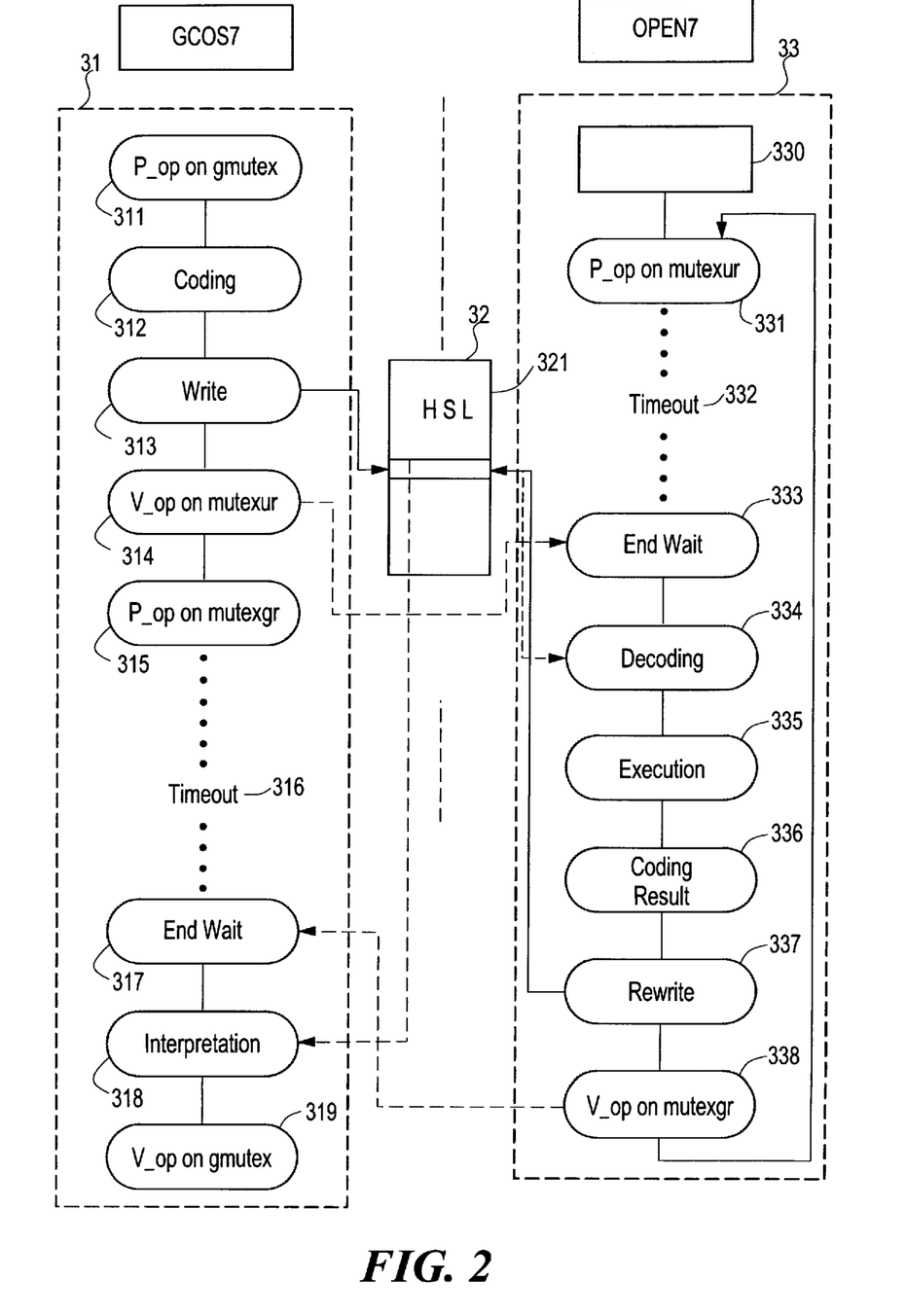
FIG. 2 presents a flowchart of the process implemented by the device.

The invention concerns primarily the device permitting the proprietary operating system (1) to communicate with the subsystem (2) and, by means of the socket functions of the open UNIX subsystem, with a remote station (B) of the UNIX type. The device contains a run time remote procedure call (31). This routine (31) communicates with a shared memory segment (32) of the machine and, via this shared memory segment (32) of the machine, with a socket server (33) which communicates with the standard library (4) of the communication functions of the open subsystem (UNIX), permitting communication with a distant computer. The process implemented by the device, and the means utilized in the device, shall now be described with the aid of FIGS. 2, 3, 4.

Figure 3:
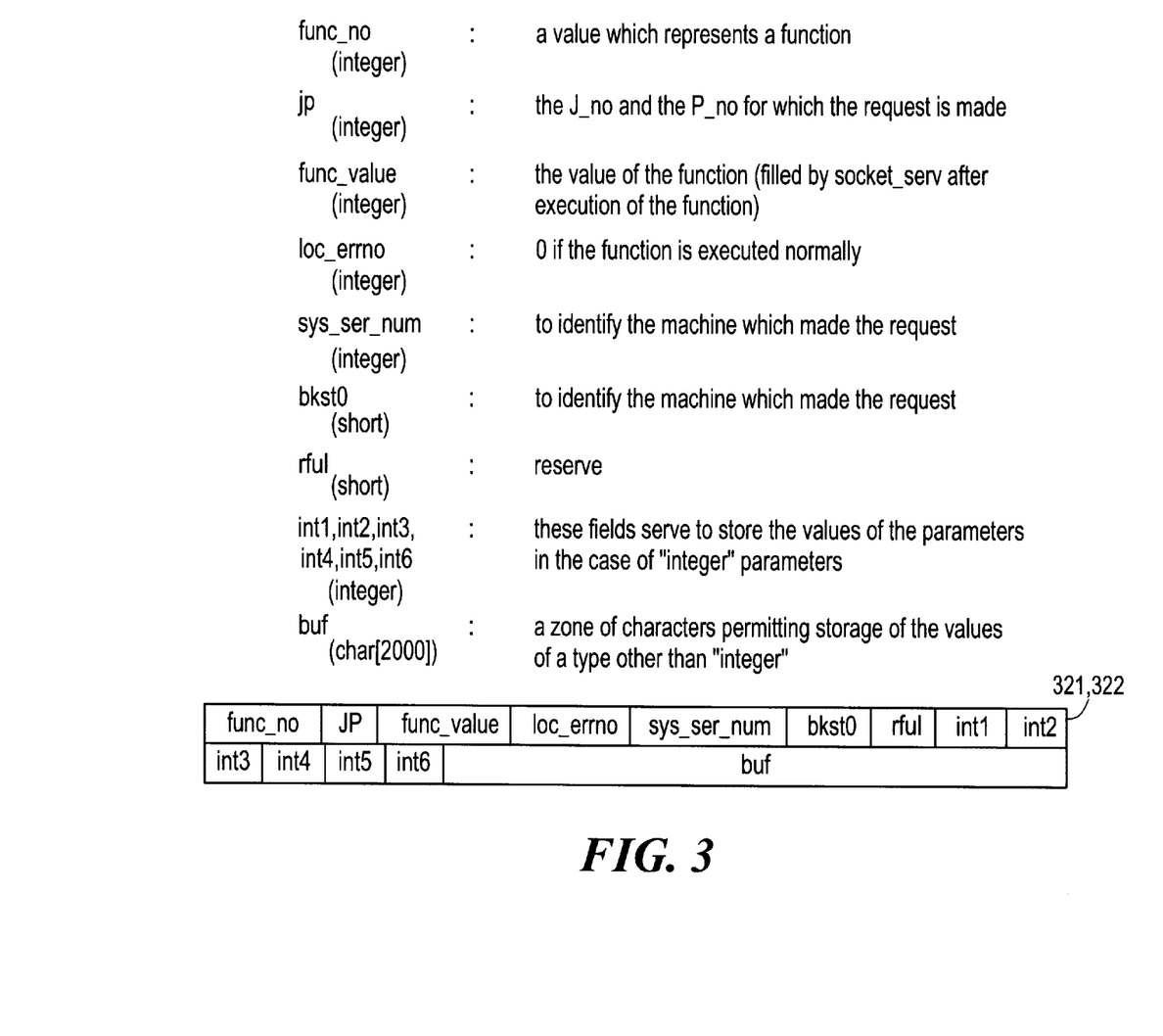
FIG. 3 represents the coding format of a function stored in a message zone of the shared memory.

The RPC (Remote Procedure Call) service routine contains a point of entry corresponding to each UNIX function which does not exist in the proprietary operating system. The parameters and the names of all these points of entry are identical to those corresponding to the absent functions. Therefore, automatically, whenever a proprietary application calls an absent function, it is the corresponding entry point of the service routine which is activated. This service routine operates as diagrammed in FIG. 2, beginning by executing an operation P on a semaphore (gmutex), as shown at step (311), and then executing a coding operation consisting of the translation into a format, shown in FIG. 3, of the function, which does not exist for the proprietary operating system, into a defined format. Then, step (313) consists of writing this function, coded in the definite format, into a segment of memory (321) of memory (32) which is shared. The service routine (31) then effects, as shown in step (314), an operation V on a semaphore (mutexur) and, at step (315), an operation P on a semaphore (mutexgr), being then subject to a timeout, as shown at step (316). The execution of operation V on the semaphore then triggers the timeout recovery of the socket server (33), which had been put on hold during step (331) by an operation P on the semaphore (mutexur) in the timeout state represented at step (332). Operation V, on the semaphore (mutexur) executed by the RPC service routine therefore activates the socket server and causes step (333), at the end of the timeout, which then launches the procedure (334) for decoding the message read in zone (321) of the shared memory. This decoding step is then followed by an execution step (335) of the function. This execution step is accomplished by a remote computer B, for example, one of the UNIX type, after having implemented the standard socket mechanism existing in the open subsystem, for example, UNIX, by utilization of the standard library of communications functions (4). This execution step is followed by a step (336) during which the result of the function is encoded, this result being received by the open subsystem part, for example, UNIX, of computer A, and proceeding from computer B. This coding is accomplished according to the format represented in FIG. 3 and, at step (337), the server (33) writes the result into segment (321) of the shared memory. Following this step, the server executes an operation V on the semaphore (mutexgr), the purpose of this operation V being to call the RPC service routine, causing the timeout (317) to end, which then launches step (318) for interpretation of the result of the function by the proprietary operating system and then an operation V on the semaphore (gmutex). The purpose of this operation V is to permit other users to perform similar tasks. The purpose of operation P at step (331) is to prevent other system users from writing to the shared segment at the same time, the purpose of operation P at step (331) being to put the socket server into timeout for the purpose of writing to the shared memory segment. Having complete utilization of the RPC ser-vice routine (31) available on the proprietary operating system, it is first of all necessary to launch the socket server (33) on the open subsystem, for example, UNIX, to execute step (330), consisting of the creation of a shared memory segment (32) and requesting the allocation of three semaphores (mutexur, gmutex and mutexgr) and then timing out on the semaphore (mutexur). The function coded by the service routine will contain the data represented in FIG. 3, and this data shall be stored in a message zone with a format represented in FIG. 3. This message zone contains a first field whose value represents the function (func_no), a second field which represents the number J and the number P for which the request is made (JP), a third field (func_value) indicating the value of the function after execution of the same. This value is provided by socket server (33) at step (337). A fourth field (loc_errno) returns the value 0 when the function is executed normally;

a fifth field (sys_ser_num) and a sixth field (bksto) which identify the machine that made the request;

a seventh reserved field (RFU1);

eighth (int1), ninth (int2), tenth (int3), eleventh (int4), twelfth (int5) and thirteenth (int6) fields, each designed to store a parameter value represented by an integer.

and finally a fourteenth field (buf) intended to form a buffer for storing characters representing parameter values other than integers.

Figure 4:
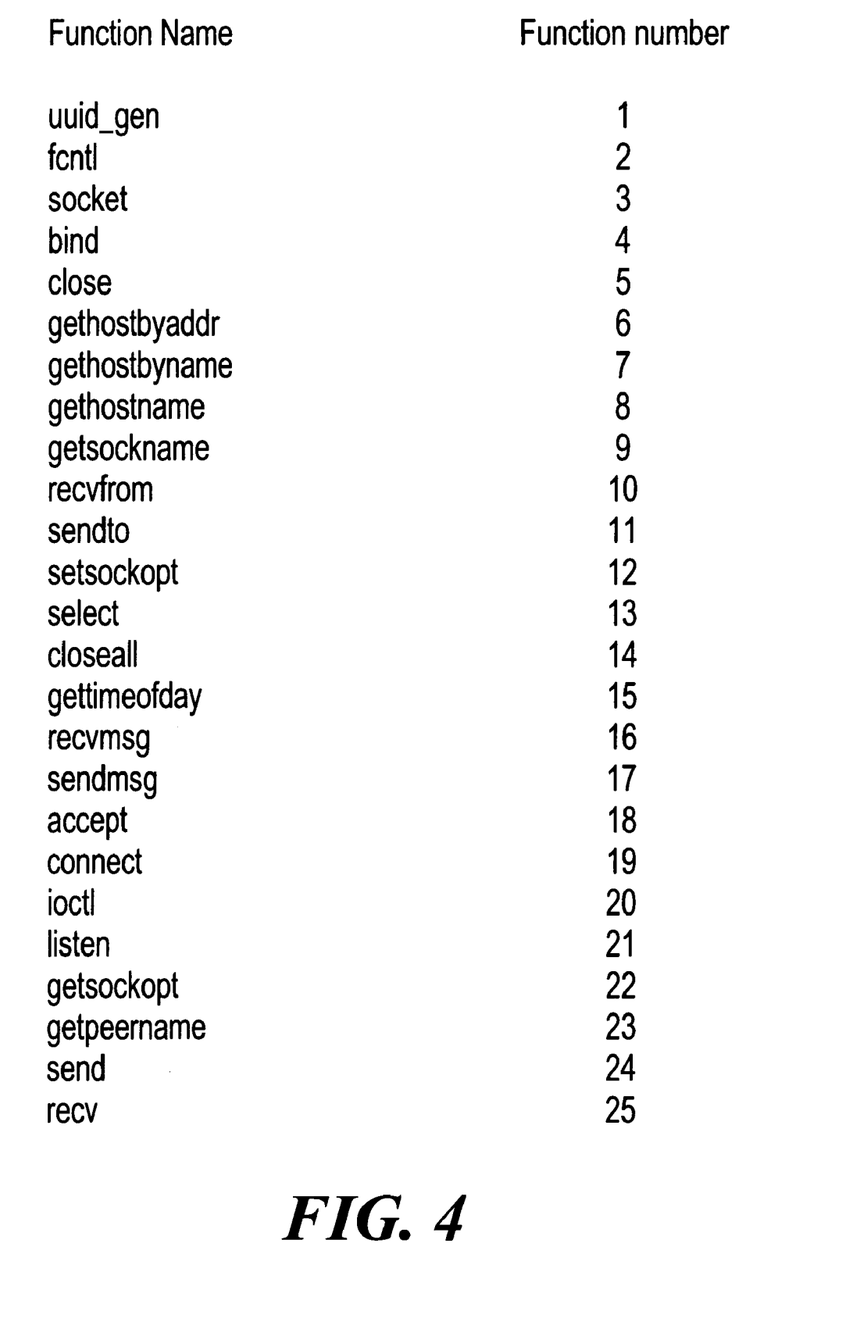
FIG. 4 represents the correspondence table utilized by the service routine, or by the socket server.

The value representing a function inscribed in the first field is translated into code by the service routine (31), or decoded by the socket server (33) according to the table appearing in FIG. 4. This table represents the principal functions implemented by the invented device.

Let us now recall that an operation P decrements (−1) the semaphore value and, if the number thus obtained is negative, the process is blocked and awaits removal of the block by an operation V which, by means of an incrementation (+1) makes the semaphore value positive. The three semaphores are created by utilizing a function (ssemall) which permits the association of an address given to a semaphore of the 0 type, this address being communicated to the server (33). The server then writes the addresses of the three semaphores into the header of the shared memory, and the operating system then attaches memory segment by means of a function (shmemat), which then permits it to recover the addresses of the three semaphores, in order to execute an operation V or an operation P according to the choice of program. Such an operation is effected by the function (ssemop) which, according to the parameter provided to it, permits the selection to be made between operation V and operation P.

To permit the invention to be better understood, we shall now describe the coding and decoding by the service routine (31) and the server (33) for some function examples given in the table in FIG. 4.

EXAMPLE 1

Each time a GCOS7 client requests a function which does not exist, for example, the "socket" function, the service routine (31) carries out the coding of this function by filling the message zone as shown below:

```
func_no = 3
int1 = dom
int2 = type
int3 = prot.
```

Fields JP, sys_ser_num and bksto are likewise filled.

The message, after it has been written into the shared memory segment, is then decoded by the server (33) which knows, per programing, that only the above fields are valid on entry for the "socket" function (func_no=3).

The server then executes the function, either locally, or by interaction with a remote computer, and codes the result in the following manner:

func_value=socket (int1, int2, int3). If func_value=−1, then the loc_errno field=−1.

The rewriting is carried out solely in these fields of the segments and, for its interpretation stage, the service routine (31) knows that only the func_value and loc_errno fields are valid on return of the "socket" function.

EXAMPLE 2

The "gethostbyname" function permits a UNIX user, not knowing the name of the "host" site, to obtain other useful data concerning the "host" site. All these data are regrouped into the structures (as indicated by our diagram). The arrows do not represent the correspondences but are pointers of a structure to another structure or towards a character string (for example "h_name"). In this way, it is enough to know the address of the first structure in order to access the ensemble of useful data concerning the "host" site. It is for this reason that the value of the function is the address of the first structure.

When the function requested by GCOS7 is the function "gethostbyname (name)", the coding program (31) knows that this function has a single entry parameter, constituted by a character string representing the name of the machine (host). The value of the function is the address of a complex structure, certain fields of the structure serving as pointers to other structures of character strings.

To pass this function call to the UNIX subsystem, OPEN7, the message zone of the memory segment is filled as follows:

```
func_no = 7
buf = name.
```

Then, the coder carries out an EBCDIC code conversion into ASCII code on the contents of the buffer, because, from the UNIX side, only ASCII characters are expected. The JP sys_ser_num and bkstO fields are likewise filled.

The message is then written into the memory segment and then decoded by the server (33) which knows that only the buffer field is a valid input for the "gethostbyname" function.

The execution is carried out in the following manner:

structure_address=gethostbyname (buffer).

If structure_address=NULL, then loc_errno=−1.

Because there is no point in returning an address found in the UNIX subsystem to the proprietary operating system, we decode the result in order to transmit all the data contained at the returned address to the proprietary operating system. This done in the following manner:

The buffer field (buf) is filled with the name and, finally, the addresses indirectly pointed to by h_addr_list, data which are concatenated to the name, which has a fixed length of 14 characters.

The return message is sent to the proprietary operating system via the shared memory segment. In the course of interpretation by GCOS7, it is known that the (int1), (int2) and (buf) fields must be allocated and filled by the "gethostbyname" function.

EXAMPLE 3

In that case where the function which does not exist is the function "sendto", the service routine (31) knows that this function has four parameters of the integer type (s, len, flags and fromlg). i=sendto (s, buffer, len, flags, from, fromlg). The "buffer" parameter is a character string and "from" is a pointer to a structure "sockaddr" having the following form:

sockaddr = [ family | data ]

or "family" is a half word of integer format, "data" is a character string with a length of 14.

All the parameters are input parameters.

The term "input parameter" is utilized to distinguish a parameter serving to supply data to a function (thus permitting the function to execute correctly) of an output parameter containing data returned by the function executed. Certain parameters can be input and output parameters, as in the case of the "select" function.

To pass this request to the server (33), the message zone is filled, as shown below:

```
func_no = 1 (the sendto function)
int1 = s
int 2 = len
int3 = flags
int4 = fromlg
```

The buffer field (buf) is filled with buffer and then the structure pointed to by from is concatenated to buffer.

[ buffer | sockaddr ]

The fields JP, sys_ser_num and bksto are likewise filled.

The message is written into the shared memory segment and is then decoded by the server (33) which knows that only the above fields are valid on input for the sendto function.

The server (33) executes the function in the following manner:

the buffer field (buf) is first decoded to recover the values of buffer and of from_structure.

func_value=sendto (int1, buffer, int2, &sockaddr, int4), &sockaddr representing the address of sockaddr, the result of the execution being presented in the form:

if func_value=−1, then loc_errno=−1

The return message is sent to the proprietary operating system via the shared memory segment. On returning to the operating system, it is known that only the func_value and loc_errno fields are valid for the "sendto" function.

EXAMPLE 4

When the function called by the client, GCOS7, is "recvfrom", the service routine knows that this function has three parameters of the integer type (s, len and flags). i=recvfrom (s, buffer, len, flags, from, fromlg). The "buffer" parameter is a pointer to a structure with the following format:

sockaddr [ family | data ]

or "family" is a half word of integer format, "data" is a character string with a length of 14.

The "fromlg" parameter points to a datum in integer format.

The parameters s, len and flags are input parameters. "fromlg" is an input parameter and an output parameter, although "buf" and "from" are output parameters only.

To pass this request to the server (33), the message zone is filled as shown below:

```
func_no = 10 (the recvfrom function)
int1 = s
int2 = len
int3 = flags
int4 = *fromlg (int4 = the value of the integer pointed
    to by fromlg).
```

The buffer field (buf) is used to contain, to the return of OPEN7, the following information.

[ buffer | sockaddr ]

The fields JP, sys_ser_num and bkst0 are also filled.

The message is written into the shared memory segment and is then decoded by the server (33) which knows that only the above fields are valid on input for the "recvfrom" function.

The server (33) executes the function in the following manner:

func_value=recvfrom (int1, buffer, int2, int3, &from_copy, &int4), &from_copy representing the address of from_copy, &int4 being the address of int4.

The result of the execution is presented in the following form:

If func_value=−1, then loc_errno=−1.

The contents of the buffer (buf) is filled directly by the call of the "recvfrom" function. The content of "from" (pointed to, from the OPEN7 side, by the address of from_copy) is then concatenated, as described above.

The message returned is sent to the proprietary operating system via the shared memory segment. On returning to the operating system, it is known that only the fields (func_value), (loc_errno), (int4) and (buf) are valid for the "recvfrom" function.

EXAMPLE 5

Finally, when the function called by the client is the function "select", the coding operation carried out by the service routine (31) knows that this function has five parameters:

i = select (nfds, readfds, writefds, execpfds, timeout)
         integer pointer pointer pointer The "nfds" parameter is an input parameter, and the others are input and output parameters, the latter four being pointers to a structure of fixed size.

To pass this function request to the server (33), the message zone is filled in the manner shown below:

```
func_no = 13 (the select function)
int1 = nfds.
```

The buffer field (buf) is then filled in the following manner:

The parameters readfds, writefds, execpfds and timeout can be zeros, the corresponding fields in the buffer (buf) being omitted in this case. This is signaled to OPEN7 by the setting to 1 or to 0 of the fields int2, int3, int4, int5, according to whether or not a parameter is present in buf.

```
int2 = 0 → readfds is NULL
int2 = 1 → readfds is not NULL
int3 = 0 → writefds is NULL
int3 = 1 → writefds is not NULL
int4 = 0 → execpfds is NULL
int4 = 1 → execpfds is not NULL
int5 = 0 → timeout is NULL
int5 = 1 → timeout is not NULL
```

The fields JP, sys_ser_num and bkstO are also filled.

The message is written into the shared memory segment and is then decoded by the server (33) which knows that only the above fields are valid on input for the "select" function.

The server (33) executes the function in the following manner:

func_value=select (int1, readptr, writeptr, execpptr, timeoutptr).

readptr, writeptr, execpptr and timeoutptr are pointers to the OPEN7 structures of the same format as those pointed to by readfds, writefds, execpfds and timeout.

The result of the execution is represented in the form:

If func_value=-1, then loc_errno=-1.

The content of the structures pointed to by readptr, writeptr, execpptr and timeoutptr is then inserted in the buffer (buf) according to the values of (int2), (int3), (int4) and (int5).

The returned message is sent to the proprietary operating system via the shared memory segment. On returning to the operating system, it is known that those are the fields valid for the "select" function.

The function examples given above are purely explanatory and not limitative, and any modifications obvious to the professional like- wise fall within the scope of the invention.

What is claimed is:

1. A device, running on a single processor of a computer system, permitting the utilization of a remote procedure call of open systems for calling remote stations, said device employing a socket procedure in a proprietary application, utilizing primitives which do not exist in a proprietary operating system and running on the computer system making use of an open subsystem UNIX capable of using the socket procedure, said device comprising:

means for communication between the proprietary application and an application under the open subsystem via shared memory segments;

means for coding the primitives of the proprietary application, which do not exist in the proprietary operating system, into a special format and storage of these primitives in a segment of the shared memory;

means for launching an application under the open system UNIX to decode and execute a function called by the primitive and to return the result of the function, expressed in the special format, in the same memory segment;

means for decoding the result of the function expressed in the special format to give the proprietary application the same visibility it would receive were it effected locally by the proprietary operating system; and means for ensuring the synchronization of accesses to the shared memory through semaphores.

2. The device according to claim 1, characterized by the fact that the means for ensuring synchronization are a first gmutex, a second mutexur and a third mutexgr semaphore.

3. The device according to claim 2, characterized by the fact that, when the proprietary application executes an operation P on the first semaphore gmutex, the application of the open subsystem executes an operation P on the second semaphore mutexur, then the proprietary application executes an operation V on the second semaphore mutexur and an operation P on the third semaphore mutexgr, then the open system application executes an operation V on the third semaphore mutexgr and, lastly, the proprietary application executes an operation V on the first semaphore gmutex.

4. The device according to claim 3, characterized by the fact that the special format in which the primitives not existing in the proprietary operating system are coded comprise a message constituted:

by a first field func_no formed by an integer representing the function;

by a second field JP representing the J number and the P number for which the request is made;

by a third field func_value indicating the value of the function after execution of the function;

by a fourth field loc_errno indicating via the value of zero that the function executed normally;

by a fifth sys_ser_num and sixth bkst0 field for identifying the machine which made the request;

by a seventh field which is reserved;

by eight int1, ninth int2, tenth int3, eleventh int4, twelfth int5, thirteenth int6 fields, each designed to store a value of the parameter represented by an integer; and by a fourteenth buffer buf field designed to store characters representing the values of parameters other than integers.

5. The device according to claim 4, characterized by the fact that the means for coding the primitives of the proprietary application into the special format comprise a correspondence table of the primitives with the integers representing the specific function and with a specific program for each function permitting the useful fields of the format to be adequately filled.

6. The device according to claim 4, characterized by the fact that the means for decoding from the special format into the primitives of the open subsystem contain a correspondence table of the integers with the primitives of the open subsystem and with a program for the specific processing of the format fields useful to each primitive of the open subsystem.

7. A method for utilizing a remote procedure call of open systems for calling remote stations from a single processor of a computer system utilizing a proprietary operating system and having an open subsystem, said method comprising the following steps:

setting of a first semaphore to a state P by the proprietary operating system, and setting of a second semaphore to a state P by the open subsystem;

coding of a function to be executed into a format given by a service routine of the proprietary system;

writing this coded function into a segment of shared memory;

setting of the second semaphore to state V;

activation, by the setting to state V of the second semaphore, of a socket server operating in the open subsystem;

decoding by the socket server of the coded function contained in the segment and simultaneous setting to state P of a third semaphore by the proprietary operating system;

execution of the decoded function by the remote station;

reception of the result by the open subsystem and recoding of this result into the specific format;

rewriting of the encoded result into the shared memory segment;

setting to state V the third semaphore, thus activating the service routine and the setting to state P of the second semaphore, thus causing the socket server to be put on hold;

interpretation by this service routine of the result of the function; and setting to state V of the first semaphore to permit other users of the proprietary operating system to do other work.

8. The method according to claim 7, characterized by the fact that, before utilization of the service routine 31 for the execution of a function not existing in the proprietary operating system, there exists a stage of the socket server 33 which creates, in a first step, a segment of shared memory 32 and requests the allocation of three semaphores gmutex, mutexur and mutexgr, before being put on hold on "mutexur".

* * * * *

UNITED STATES PATENT AND TRADEMARK OFFICE
CERTIFICATE OF CORRECTION

PATENT NO.     : 6,212,572 B1
DATED          : April 3, 2001
INVENTOR(S)    : Alev Aydin et al.

It is certified that error appears in the above-identified patent and that said Letters Patent is hereby corrected as shown below:

Column 2,
Line 14, "execu-tion" should read -- execution --;
Line 37, "imple-menting" should read -- implementing --;
Line 65, "to," should read -- to --;

Column 4,
Line 59, "bksto" should read -- bkstO --;

Column 5,
Line 41, "bksto" should read -- bkstO --;

Column 8,
Line 18, "bkst0" should read -- bkstO --;

Column 9,
Line 48, "like-wise" should read -- likewise --; and

Column 10,
Line 41, "(int5," should read -- int5 --;

Signed and Sealed this

Fourth Day of June, 2002

*Attest:*

*Attesting Officer*

JAMES E. ROGAN
*Director of the United States Patent and Trademark Office*